United States Patent [19]
Yamaguchi

[11] Patent Number: 4,805,272
[45] Date of Patent: Feb. 21, 1989

[54] FASTENER WITH TAPE

[75] Inventor: Mitsuhiro Yamaguchi, Hyogo, Japan

[73] Assignee: Morito Co., Ltd., Osaka, Japan

[21] Appl. No.: 945,487

[22] Filed: Dec. 23, 1986

[30] Foreign Application Priority Data

Dec. 27, 1985 [JP] Japan .................. 60-298577

[51] Int. Cl.$^4$ ............................ A44B 17/00
[52] U.S. Cl. .................... 24/623; 24/662; 24/693
[58] Field of Search ........... 24/625, 623, 693, 142, 24/578, 90 HA, 622, 624, 618, 692, 662, 688

[56] References Cited

U.S. PATENT DOCUMENTS

| | | | |
|---|---|---|---|
| 488,090 | 12/1892 | Rudge | 24/625 |
| 1,268,870 | 6/1918 | Moss | 24/623 |
| 1,524,637 | 1/1925 | Carr | 24/623 |
| 2,187,296 | 1/1940 | Appel | 24/692 |
| 2,368,100 | 1/1945 | Boenecke | |
| 2,724,884 | 11/1955 | Jones | 24/693 |
| 2,821,764 | 2/1958 | Leahy et al. | 24/142 |
| 2,838,820 | 6/1958 | Hakanson | |
| 3,152,376 | 10/1964 | Boser et al. | 24/618 |
| 3,800,368 | 4/1974 | Simon | 24/693 |

FOREIGN PATENT DOCUMENTS

| | | | |
|---|---|---|---|
| 1018365 | 10/1957 | Fed. Rep. of Germany | 24/693 |
| 359227 | 3/1906 | France | 24/618 |
| 2237592 | 2/1975 | France | |
| 435988 | 7/1949 | Italy | 24/623 |
| 47-7825 | 4/1972 | Japan | |
| 55-2469 | 1/1980 | Japan | |
| 55-3950 | 1/1980 | Japan | |
| 55-3951 | 1/1980 | Japan | |
| 56-16311 | 2/1981 | Japan | |
| 56-128004 | 9/1981 | Japan | |
| 57-34812 | 2/1982 | Japan | |

Primary Examiner—Kenneth J. Dorner
Assistant Examiner—James R. Brittain
Attorney, Agent, or Firm—Trexler, Bushnell, Giangiorgi & Blackstone, Ltd.

[57] ABSTRACT

A fastener with tape comprising a tape having at least one through hole and at least one associated fastener element made of synthetic resin and having at least one mold hole. The synthetic resin is bonded to the face and reverse sides of the tape via a portion of the through hole. The bending of the tape is substantially inhibited by the mold holes.

5 Claims, 8 Drawing Sheets

FASTENER WITH TAPE

The present invention relates to a fastener with tape and a method of manufacturing the same. In this specification, the term "fastener with tape" is a device adapted to open and close a junction or "zipper-seam" in a clothes, shoe, tent or other sheet or web, and means a snap fastener or eyelet with tape, for instance.

Recently a fastener with tape comprising a tape having a plurality of synthetic resin fastening members as molded thereto as a unit has been developed and put to use in certain applications. Patent applications have also been made on such devices and techniques. For example, such devices are described in Japanese Patent Application Kokai No. 47-7825 and Japanese Utility Model Application Kokai No. 55-3950, No. 55-3951, No. 56-16311 and No. 56-128004, for instance.

Taking the snap fastener as an example, the conventional method of manufacture may be summarized as follows. Referring to FIG. 8 which shows such a known technology, a tape 2a having through holes 1 is fed into a clearance between a couple of upper and lower metal mold components 3a and 3b by means of an automatic feeding mechanism and when one of the through holes 1 is positioned in a molding cavity or chamber 4 defined by the metal mold components 3a, 3b, synthetic resin is filled into the chamber and cured in situ.

According to this prior art technology, as indicated in two dots-chain lines in FIG. 8, the tape 2a in the neighborhood of said through hole 1 in the molding chamber 4 defined by said mold components 3a, 3b is liable to be displaced by the flow pressure of resin as the resin is injected under pressure into the chamber 4. Therefore, as shown in FIG. 9, the tape 2a is displaced out of center towards the face or reverse side of the fastener body in the neighborhood of through hole 1 so that the resin body is not firmly secured to the tape or a variation in strength occurs. Moreover, portions of tapes 2a and 2b tend to be exposed in the neighborhood of through hole 1 on the surfaces of the bodies 7, 8 of male and female members 5, 6 of the snap fastener, thus detracting from the aesthetic quality of the product. To overcome these disadvantages, the thickness of the seat portion of the resin body must be increased. However, if it is done, the product is increased in thickness and as a consequence, the joint of the clothes using the product becomes bulky.

The present invention has been accomplished to overcome the above-mentioned disadvantages.

It is an object of the present invention to provide an improved fastener with tape such that the fastener seat is firmly secured to the tape, the tape is not exposed locally in the neighborhood of the through hole, and the fastener device is not bulky but thin.

It is another object of the present invention to provide a method of manufacturing fasteners of the type just mentioned.

The synthetic resin fastener with tape according to the present invention comprises a tape having at least one through hole and at least one associated synthetic resin fastener body or element having at least one mold hole, said synthetic resin being bonded to the face and reverse sides of said tape via a portion of said through hole and said mold hole(s) substantially inhibiting the bending of said tape.

The manufacturing method according to the present invention comprises introducing a tape having at least one through hole into a molding chamber defined by a set of mold components and having a shape corresponding to a desired fastener element and, with the tape in the vicinity of said throughhole being held in position with projections provided in said molding chamber, and feeding a synthetic resin into said molding chamber to give a fastener element integral with the tape on cure of the resin.

The tape may be made of any material that is receptive and bondable to synthetic resin. For example, a textile cloth may be employed.

The synthetic resin may be any resin that can be injection-molded. For example, polyacetal, polyethylene and nylon may be employed.

The projections of the metal mold are intended to prevent displacement of the tape by the flow pressure of the resin and may therefore be of any configuration inasmuch as the above purpose is served. The projections may generally be cylindrical but may be configured in the form of plates contiguous to the mold. There is no limitation on the number of such projections. A single projection may serve the purpose but it is generally preferable to provide a plurality, for example 2 to 8, projections.

In accordance with the present invention, the tape in the neighborhood of the through hole is substantially not displaced by the flow pressure of resin when the resin is injected and cured, with the result that the tape can be set in position substantially centrally in the thickness direction of the seat and the resin be uniformly secured to the tape. Moreover, it does not happen that the tape is locally exposed on the seat near the through hole to detract from the aesthetic quality of the product.

In another mode of the present invention which is suited for certain applications, tee female member of the fastener may be fitted onto the male member from whichever of the face and reverse sides. A snap faster of this construction provides two different engaging forces using the same male and female members.

The present invention will now be described in detail with reference to the accompanying drawings, in which.

Figure 12:
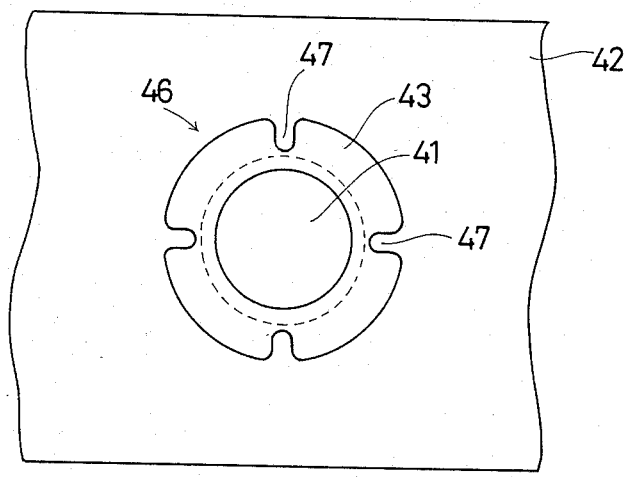
Figure 13:
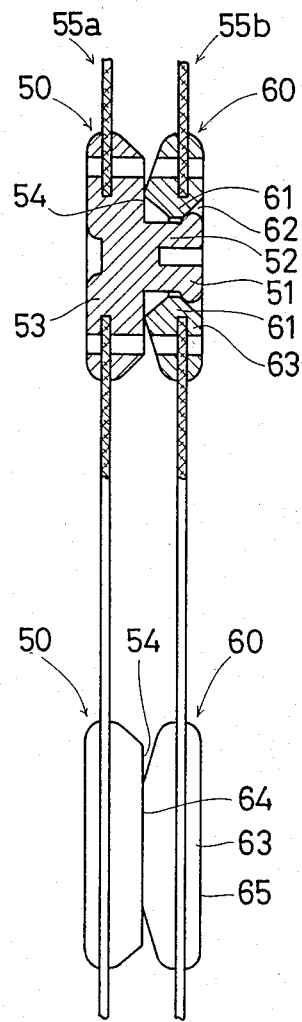
Figure 14:
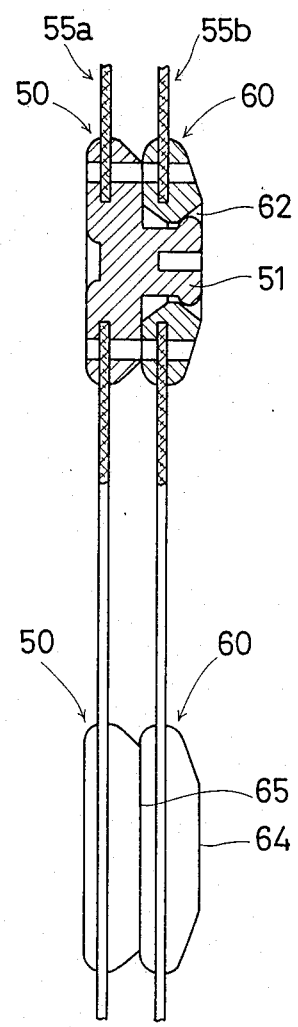
Figure 15:
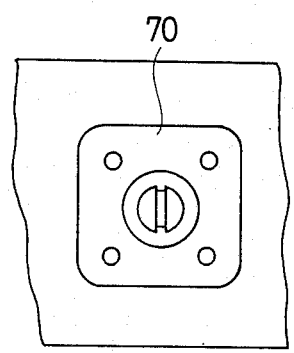
Figure 16:
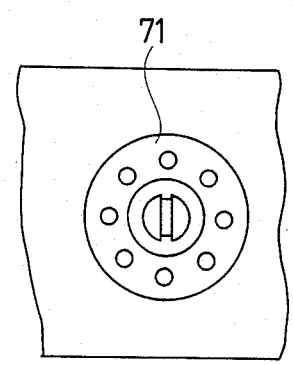
Figure 17:
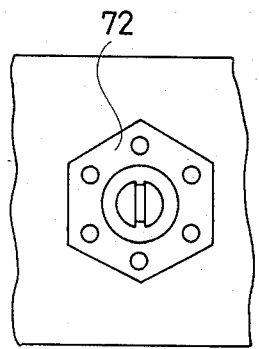
Figure 18:
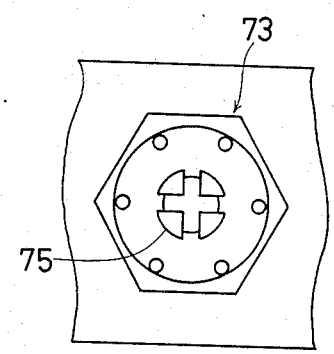
Figure 19:
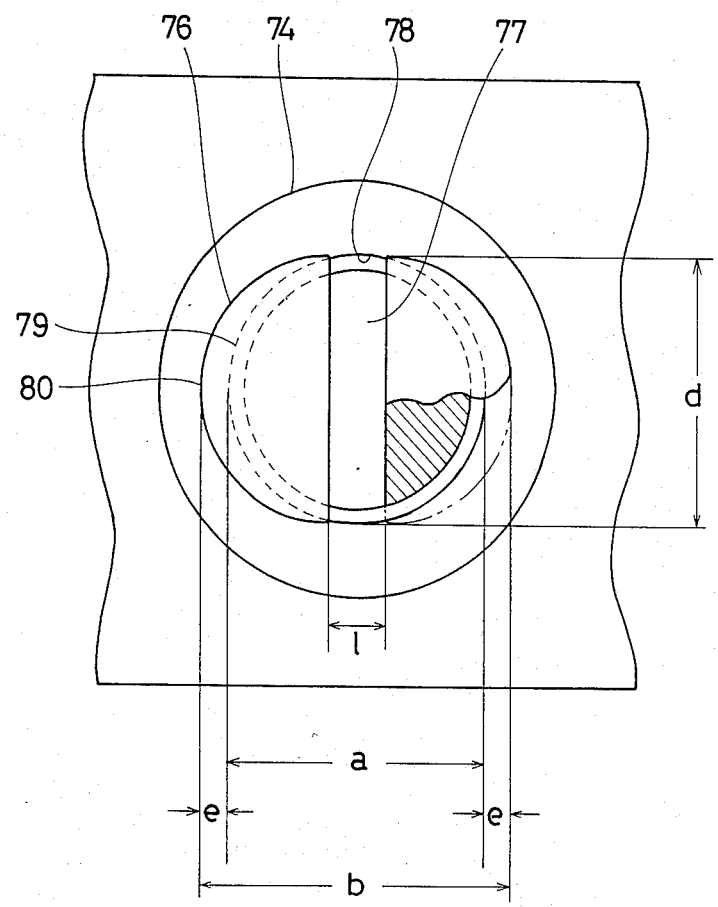

FIG. 12 a plan view showing another eyelet with tape according to the fourth embodiment of the present invention;

FIG. 13 is a view, in partial section, showing the male and female members, as mated, of a snap fastener with tape according to the fifth embodiment of the present invention (the female member with its face side up mated with the male member);

FIG. 14 is a view, in partial section, showing the male and female members, as mated, of a snap fastener with tape according to the sixth embodiment of the present invention (the female member with its reverse side up mated with the male member);

FIG. 15 a plan view showing the male and female members, as mated, of a snap fastener with tape according to the sixth embodiment of the present invention as viewed from the female member side;

FIG. 16 is a plan view showing the male and female members, as mated, of a snap fastener with tape according to a seventh embodiment of the present invention as viewed from the female member side;

FIG. 17 is a plan view showing the male and female members, as mated, of a snap fastener with tape according to the eighth embodiment of the present invention as viewed from the female member side;

FIG. 18 is a plan view showing the male and female members, as mated, of a snap fastener with tape according to the ninth embodiment of the present invention as viewed from the female member side; and FIG. 19 is a plan view showing the male and female members, as mated, of a snap fastener with tape according to the tenth embodiment of the present invention as viewed from the female side.

FIGS. 1 through 5 illustrate a first embodiment of the present invention. The fastener in this embodiment is a snap fastener.

Figure 1:
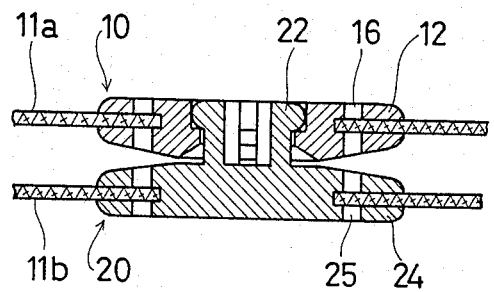
FIG. 1 is a sectional view showing the male and female members, as mated, of a snap fastener with tape according to the first embodiment of the present invention.
Figure 2:
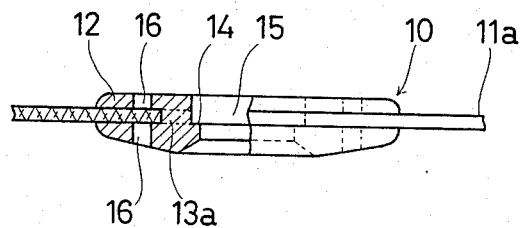
FIG. 2 is a partially exploded view, in section, showing the female member of the fastener with tape according to the first embodiment of the present invention.

As shown in FIGS. 1 and 2, the female member 10 of the snap fastener comprises a tape 11a and a synthetic resin fastener body 12 formed integrally therewith.

The tape 11a is an elongated element made of fabric material and is provided with through holes 13a arranged along the centerline of the tape at predetermined intervals. The body 12 which is comparatively thin is centrally provided with a mating hole 15 extending there-through and having a stepped portion 14 in an intermediate position. This body 12 is disposed to cover the face and reverse sides of the tape 11a around the tape through hole 13a and is provided with a plurality of mold holes 16.

Figure 4:
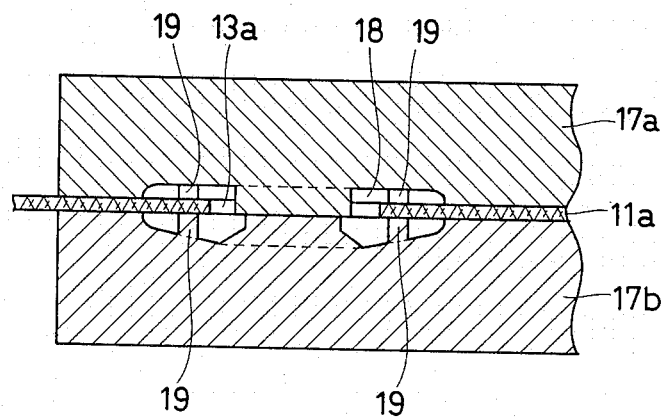
FIG. 4 is a sectional view showing the metal mold defining a molding chamber in which the tape is gripped by projections in the vicinity of the through hole.
Figure 5:
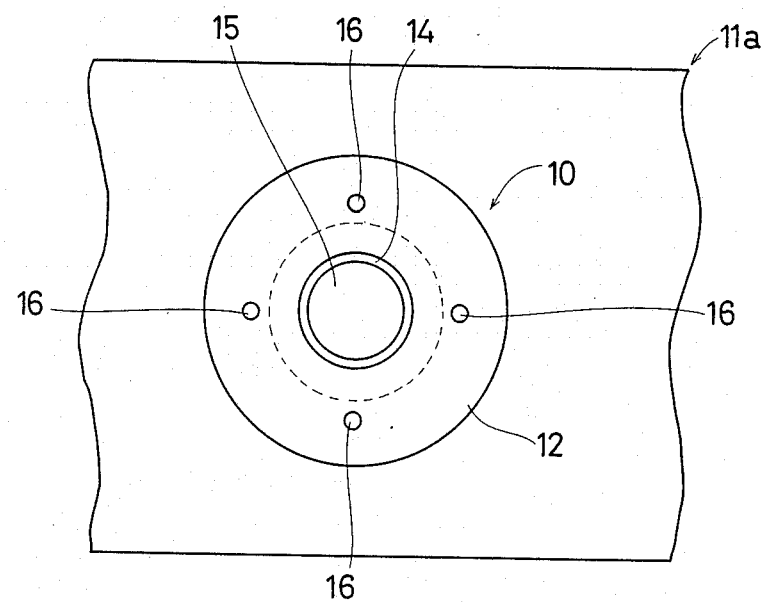
FIG. 5 is a plan view showing the female fastener member formed by means of the metal mold shown in FIG. 4.

This female member 10 of the fastener is manufactured in the following manner. First, as shown in FIG. 4, the tape 11a provided with a plurality of through holes 13a at equal intervals is fed into the space between a pair of upper and lower mold components 17a, 17b by an automatic continuous feeding apparatus. Then, the upper and lower mold components 17a, 17b are superposed in such a manner that the portion of tape 11a in the neighborhood of through hole 13a is sandwiched between projections 19 within a molding chamber 18 formed by the mold components 17a, 17b. Thereafter, synthetic resin, for example, polyacetal is fed under pressure into the molding chamber 18 and cured or solidified in situ to form an integral assemblage with the tape and finally the tape is removed from the mold to give a finished product.

As shown in FIG. 4, the metal mold forms the molding chamber 18 corresponding to the shape of the female member 10 and is provided with a plurality of cylindrical projections 19 which are complementary to the mold holes 16 formed in the body 12 of the female member 10.

Figure 3:
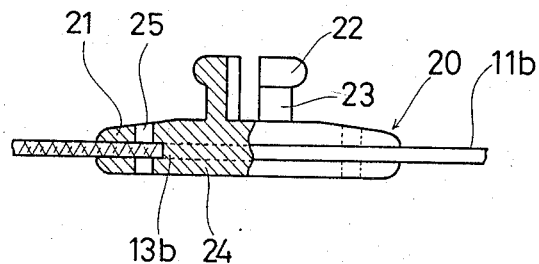
FIG. 3 is a partially exploded view, in section, of the male member of the snap fastener according to the first embodiment of the present invention.

As shown in FIG. 3, a male member 20 comprises a tape 11b and a synthetic resin fastener body 21 formed integrally therewith.

The tape 11b is similar to that used in the manufacture of the female member 10.

The body 21 comprises a mating projection 23 having a bulging head 22 and a seat portion 24 supporting it. The bulging head 22 is configured to be flat at top and adapted to engage with the stepped portion 14 in the mating hole 15 of the female member 10. The mating projection 23 has a height approximately equal to the dimension of the mating hole in the thickness direction of the female member 10 and is vertically divided in two portions. The seat 24 covers the face and reverse sides of the tape 11b in the neighborhood of a tape through hole 13b. The seat 24 is provided with a plurality of mold holes 25 near the tape through hole 13b.

The male member 20 of the snap fastener according to the present invention is manufactured in the same manner as the female member 10 described hereinbefore.

The snap fastener according to the present invention can be used in the same manner as the conventional snap fastener. Thus, the tape 11a carrying female members 10 and the tape 11b carrying male members 20 are cut to a desired length and attached to the joining parts of a clothing or the like. Then, as shown in FIG. 1, the mating projections 23 of the male members 20 are snapped into the mating holes of the corresponding female members 10 so as to disengageably join the male and female members 10, 20. In this embodiment, since the bulging head 22 is flat at top, it does not protrude from the engaging female member 10, thus giving no unpleasant sense of touch to a user's finger.

Figure 6:
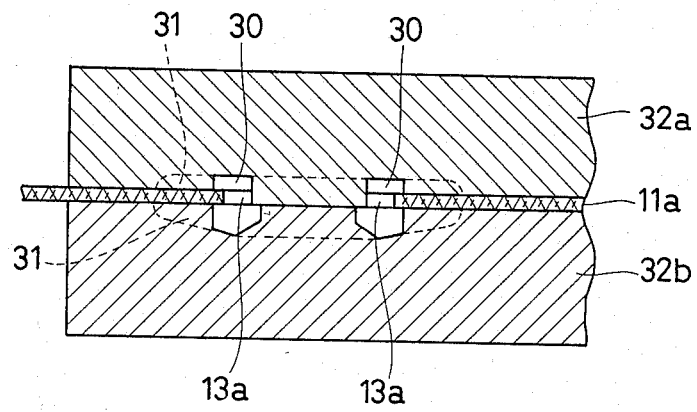
FIG. 6 is a sectional view of another metal mold for use in the second embodiment of the present invention, showing the tape held in position in the vicinity of the through hole by projections in the molding chamber.
Figure 7:
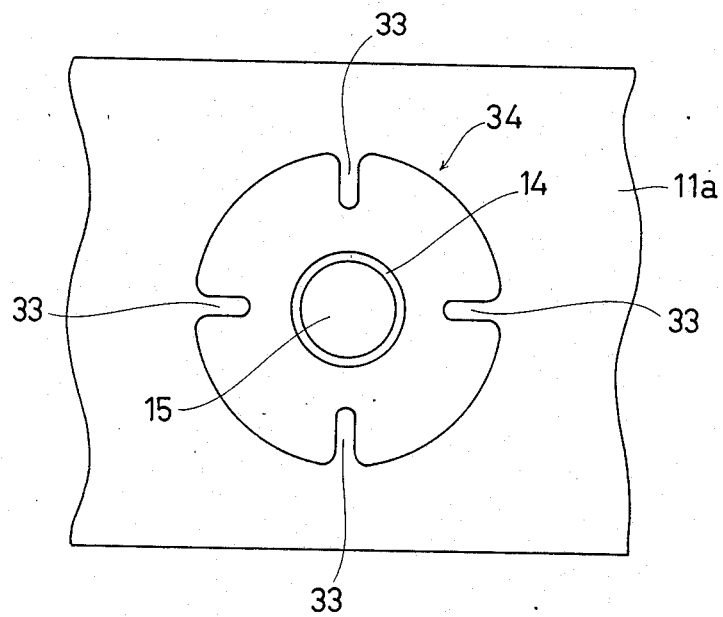
FIG. 7 is a plan view of the female member formed by means of the metal mold shown in FIG. 6.
Figure 8:
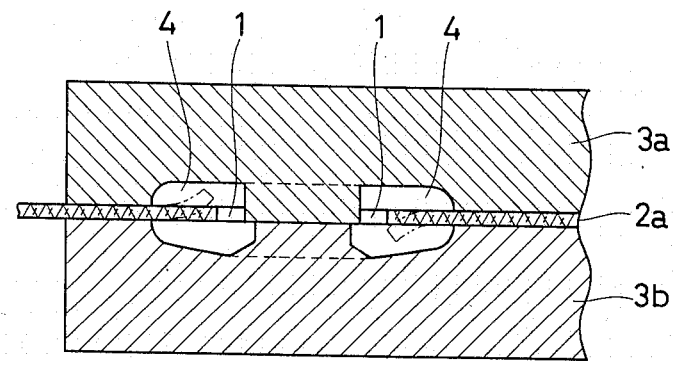
FIG. 8 is a sectional view of the conventional metal mold, showing the tape held in the vicinity of the through hole by projections in the molding chamber.
Figure 9:
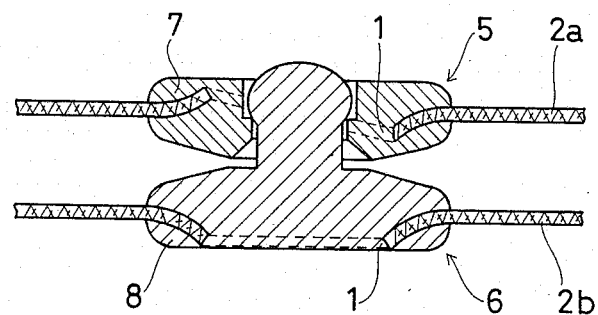
FIG. 9 is a sectional view showing the male and female members, as mated, of the conventional snap fastener.

In a second embodiment illustrated in FIG. 6, there are employed metal mold components 32a, 32b each having a plurality of plate-shaped projections 31 within a molding chamber 30 to be formed. With this split mold, a female member having nick-shaped mold holes 33 is obtained as illustrated in FIG. 7.

Figure 10:
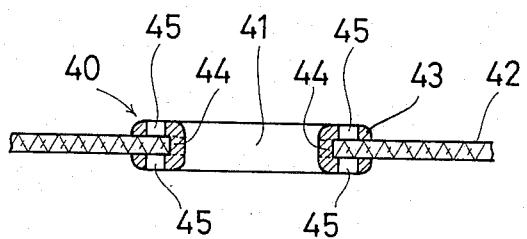
FIG. 10 is a sectional view showing an eyelet with tape according to the third embodiment of the present invention.
Figure 11:
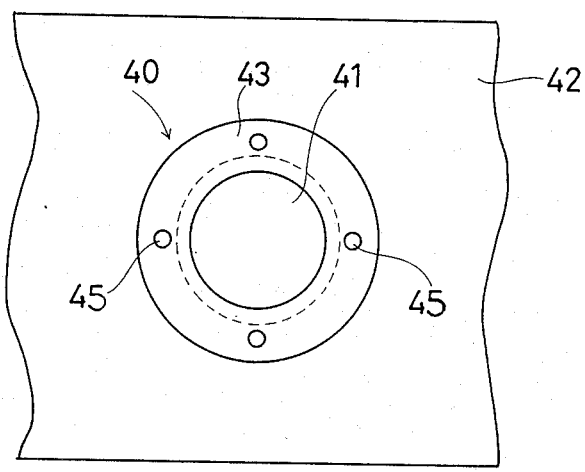
FIG. 11 is a plan view showing the eyelet with tape according to the third embodiment of the present invention.

FIGS. 10 and 11 show a third embodiment of the present invention. Except that this fastener is an eyelet, the construction is substantially identical with that of the first embodiment. An eyelet 40 according to this embodiment has an insertion hole 41 centrally extending through its thickness. Its body 43, which is comparatively small in thickness, covers the face and reverse sides of a tape 42 in the neighborhood of its insertion hole 41 and has a plurality of mold holes 45 around the tape through hole 44.

FIG. 12 shows a fourth embodiment of the present invention. This fastener is also an eyelet 46 but the configuration of the mold holes 47 is different from that obtained in FIG. 11. The eyelet 46 can be obtained by using metal mold similar to the one used in FIG. 6 having plate-like projections.

The snap fastener illustrated in FIGS. 13 and 14 is a fifth embodiment of the present invention.

This is a snap fastener such that a female member may be set in engagement with a male member from whichever side desired. In this embodiment, although the same male and female member are used, different engaging forces can be obtained according to the side from which the female member is engaged with the male member. Thus, on one hand, it serves as a snap faster which is a little bulky but provides a less strong engaging force for applications such as a diaper. On the other hand, it serves as a snap fastener which has a more engaging force but is thin enough for applications such as men's shirts.

As shown in FIGS. 13 and 14, this snap fastener also comprises a male member 50 and a female member 60.

The male member 50 comprises a mating projection 52 having a bulging head 51 with a flat top and having been split into two parts except at the base thereof and a comparatively thin frustoconical seat portion 53 supporting said mating projection 53. This seat portion 53 is provided with a flat male surface 54 of increased diameter near the base of the mating projection 52. Though not shown, the reverse side of the male member may be decorated by cladding it with a metal cover, for instance.

The female member 60 comprises an engaging portion 61 of reduced diameter in an intermediate position in the thickness direction, with its diameter being gradually increased toward the face and reverse sides, and a comparatively thin frustoconical body 63 having a mating hole 62 communicating with the face and reverse sides in a center thereof. The body 63 of the female member is so constructed that its thickness near the mating hole 62 is approximately equal to the height of the mating projection 52 of the male member 50. The female member has a female face surface 64 on the face side in the vicinity of the mating hole 62, the diameter of said female face surface being smaller than the diameter of said flat male surface 54 of the male member, while the female member has a female reverse surface 65 on its reverse side around the mating hole 62, the diameter of said female reverse surface 65 being larger than the flat male surface 54 of the male member 50.

The method of joining tapes 55a, 55b to the male and female members 50, 60, respectively, is the same as that described in connection with the previous embodiments.

FIG. 13 shows the male and female members 50, 60 as mated with the face side 64 of the female member 60 up, and FIG. 14 shows the male and female members 50, 60 as mated with the reverse side 65 of the female member 60 up. In the case of FIG. 13, the fastener becomes bulky but provides a relatively lower engaging force. In the case of FIG. 14, the fastener structure is thin but provides a little higher engaging force.

FIGS. 15 through 19 show further embodiments, namely snap fasteners 70, 71, 72, 73 and 74, respectively. All are plan views showing the male and female members as mated as viewed from the female member side. Each of these fasteners has a characteristic configuration. For example, in the snap fastener shown in FIG. 18, a head portion 75 of its male member has been divided into 4 parts instead of 2 parts. Though not shown, various modifications may be made by those skilled in the art on the basis of the configurations shown in the drawings.

The snap fastener 74 shown in FIG. 19 is characterized, along with the aforementioned features of the present invention, by the shape of its bulging head 76. The head 76 is greater in diameter in dimention in the transverse direction perpendicular to a groove 77 provided in the head 76 than in the longitudinal direction. Preferably, the relationship of various dimentions of this bulging head 76 is as follows.

$$l \geq 2e = b - a; d = a$$

where l is the width of a groove 77,
b is the outer diameter of an expanded (increased diameter) portion 80 of the bulging head,
d is the inner diameter in the longitudinal direction of an engaging portion 79 of a mating hole 78 and
e is the difference at left end or right end between the outer diameter of the expanded portion 80 of the bulging head 76 and the inner diameter in the transverse direction of the engaging portion 79 of the mating hole 78.

In the above construction, the insertion and removal of the male member is facilitated and a high engaging force is obtained with comparatively liberal manufacturing tolerances.

It should be understood that the foregoing relates to only preferred embodiments of the invention, and that it is intended to cover all changes and modifications of the examples of the invention herein chosen for the purposes of the disclosure, which do not constitute departures from the spirit and scope of the invention.

What is claimed is:

1. A fastener with tape comprising: a male member comprising a mating projection having a bulging head and a seat portion supporting said mating projection, said seat portion having a flat male surface near the base of the mating projection, and a female member comprising: a body having a mating hole in a center thereof, communicating with face and reverse sides, the mating hole having an approximately equal height to the mating projection of the male member and having a reduced diameter intermediate portion with its inner diameter being gradually increased toward the face and reverse sides to provide respective lead-in surfaces for said male member head, a female face surface on the face side around the mating hole, said female face surface being in contact with the flat male surface when the female member is set in engagement with the male member with its face surface side up, the maximum diameter of said female face surface being smaller than the diameter of said flat male surface of the male member, a female reverse surface on its reverse side around the mating hole, said female reverse surface being in contact with the flat male surface when the female member is set in engagement with the male member with its reverse surface side up, the minimum diameter of said female reverse surface being larger than the flat male surface of the male member; whereby the female member face and reverse surfaces are asymmetrical such that the female member can be engaged with the male member from either side of the female member, with a correspondingly different force of engagement which is brought about by the difference of the contact areas of the male member with the female member between when the female member is set in engagement with the male member with its face side up and when the female member is set in engagement with the male member with its reverse side up; and wherein said female member has at least one mold hole across which the tape at least partially extends internally thereof.

2. A fastener with tape according to claim 1 wherein said bulging head is flat on top.

3. A fastener with tape according to claim 1 wherein said male member has at least one mold hole across which the tape at least partially extends internally thereof.

4. A fastener with tape according to claim 1 wherein said bulging head has at least one laterally extending groove.

5. A fastener with tape according to claim 4 wherein said bulging head is greater in dimension in the transverse direction perpendicular to said groove than in the longitudinal direction parallel to said groove.

* * * * *